(12) United States Patent
Sugiyama et al.

(10) Patent No.: US 11,222,633 B2
(45) Date of Patent: Jan. 11, 2022

(54) DIALOGUE METHOD, DIALOGUE SYSTEM, DIALOGUE APPARATUS AND PROGRAM

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Toyomi Meguro, Soraku-gun (JP); Junji Yamato, Soraku-gun (JP); Yuichiro Yoshikawa, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 198 days.

(21) Appl. No.: 16/301,641

(22) PCT Filed: May 19, 2017

(86) PCT No.: PCT/JP2017/018785
§ 371 (c)(1),
(2) Date: Nov. 14, 2018

(87) PCT Pub. No.: WO2017/200072
PCT Pub. Date: Nov. 23, 2017

(65) Prior Publication Data
US 2019/0206406 A1     Jul. 4, 2019

(30) Foreign Application Priority Data

May 20, 2016  (JP) .............................. JP2016-101218

(51) Int. Cl.
*G10L 15/22* (2006.01)
*B25J 13/08* (2006.01)
(Continued)

(52) U.S. Cl.
CPC .............. *G10L 15/22* (2013.01); *A63H 3/003* (2013.01); *A63H 3/28* (2013.01); *B25J 11/0005* (2013.01);
(Continued)

(58) Field of Classification Search
CPC .............. G10L 15/22; G10L 2015/223; G10L 2015/225
See application file for complete search history.

(56) References Cited

U.S. PATENT DOCUMENTS

2006/0177802 A1* 8/2006 Hiroe ...................... G10L 13/00
434/185
2007/0255566 A1* 11/2007 Nguyen .................. G10L 15/22
704/257
(Continued)

FOREIGN PATENT DOCUMENTS

| JP | 2002-169590 A | 6/2002 |
| JP | 2004-287016 A | 10/2004 |
| JP | 2015-125198 A | 7/2015 |

OTHER PUBLICATIONS

International Search Report dated Aug. 1, 2017 in PCT/JP2017/018785 filed May 19, 2017.
(Continued)

*Primary Examiner* — Samuel G Neway
(74) *Attorney, Agent, or Firm* — Oblon, McClelland, Maier & Neustadt, L.L.P.

(57) ABSTRACT

The present invention improves a sense of participation in a topic and enables a dialogue to continue for a long time. A dialogue system 12 includes at least an input part 1 that receives a user's utterance and a presentation part 5 that presents an utterance. In an utterance receiving step, the input part 1 receives an utterance performed by the user. In a first presentation step, the presentation part 5 presents an utterance determined based on scenarios stored in advance.
(Continued)

In a second presentation step, the presentation part 5 presents the utterance determined based on the user's utterance contents. A dialogue control part 8 performs control to execute a dialogue at least including a first dialogue flow which is a dialogue including the utterance receiving step and the first presentation step at least one time respectively based on a predetermined scenario, and a second dialogue flow which is a dialogue including the utterance receiving step and the second presentation step at least one time respectively.

5 Claims, 5 Drawing Sheets

(51) Int. Cl.
    *A63H 3/28*     (2006.01)
    *A63H 3/00*     (2006.01)
    *G10L 13/00*     (2006.01)
    *G10L 15/26*     (2006.01)
    *B25J 11/00*     (2006.01)

(52) U.S. Cl.
    CPC .............. B25J 13/08 (2013.01); G10L 13/00 (2013.01); G10L 15/26 (2013.01); *A63H 2200/00* (2013.01); *G10L 2015/223* (2013.01); *G10L 2015/225* (2013.01)

(56) References Cited

U.S. PATENT DOCUMENTS

| | | | |
|---|---|---|---|
| 2012/0035935 A1* | 2/2012 | Park | G10L 15/22 704/275 |
| 2012/0173244 A1* | 7/2012 | Kwak | G10L 15/22 704/275 |
| 2014/0136212 A1* | 5/2014 | Kwon | G10L 15/22 704/275 |
| 2014/0149121 A1* | 5/2014 | Di Fabbrizio | G10L 21/00 704/270.1 |
| 2019/0206406 A1* | 7/2019 | Sugiyama | G10L 13/043 |

OTHER PUBLICATIONS

Arimoto, T. et al., "Impression Evaluation of Dialogue without Voice Recognition by Plural Robots," Conference of the Robotics Society of Japan, 2016, 4 pages (with partial English language translation).

Sugiyama, H. et al., "Leveraging Dependency Relations and Sentence Examples in Web-scale Corpus for Open-domain Utterance Generation," Transactions of the Japanese Society for Artificial Intelligence, vol. 30(1), 2015, pp. 183-194 (with partial English language translation).

Meguro, T. et al., "Building a conversational system based on the fusion of rule-based and stochastic utterance generation," Proceedings of the 28th Annual Conference of the Japanese Society for Artificial Intelligence, vol. 28, 2014, pp. 1-4 (with partial English language translation).

Japanese Office Action dated Jan. 14, 2020, in Patent Application No. 2018-518372, 7 pages (with English translation).

\* cited by examiner

DIALOGUE METHOD, DIALOGUE SYSTEM, DIALOGUE APPARATUS AND PROGRAM

TECHNICAL FIELD

The present invention relates to a technique for a computer to perform a dialogue with a human using a natural language, which is applicable to a robot or the like communicating with humans.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, and also can show the resident having dialogue with the robot to make chances to start dialogue between the resident and people around the resident such as his/her family and nurses. In addition, at the site of communication training, there is a usage pattern in which a robot becomes a training partner. More specifically, the robot becomes a training partner for foreign language learners at foreign language schools, thus helping the foreign language learners to efficiently proceed with foreign language learning. Furthermore, in an application as an information presentation system, robots perform a dialogue with each other and have their dialogue heard by people as a basis, sometimes talk to people, cause the people to join in dialogue without making the people bored, and can thereby present information in a form easily acceptable to the people. More specifically, when people feel bored at a meeting place, a bus stop, a platform at a station or the like in a town or when people can afford to participate in a dialogue at home, a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialogue through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among people. By applying a technique of dialogue with robots to this chat service, it is possible to implement a chat service whereby robots can perform dialogues with users more naturally even in the absence of any chat partner.

In the present specification, hardware which becomes a dialogue partner to a user such as robots used in these services or a chat partner, or computer software for causing a computer to function as hardware to become the user's dialogue partner are generically called an "agent." Since the agent is intended to become the user's dialogue partner, the agent may be personified such as a robot or a chat partner, personalized or may possess characters or individuality.

The key to the implementation of these services is a technique that enables the agent implemented by hardware or computer software to perform a dialogue with humans naturally.

One example of the above-described agent is a scenario dialogue system that performs a dialogue with a user about a specific topic along a predetermined scenario. The scenario dialogue system allows the dialogue to be continued as long as the dialogue develops along the scenario. For example, a dialogue system described in Non-patent literature 1 is a system that performs a dialogue between the user and a plurality of agents by including an interrupt by an agent or interaction between agents. For example, an agent utters a question provided in the scenario to the user and when the user's utterance of reply to the question corresponds to a choice provided in the scenario, the dialogue system functions so as to perform an utterance corresponding to the choice. That is, the scenario dialogue system is a dialogue system in which the agent performs an utterance based on a scenario stored in advance in the system. In this dialogue system, the agent asks a question to the user, and upon receiving an answer from the user, the agent chimes in with, for example, "I see" irrespective of the utterance contents of the user or changes the topic with an interrupt by the agent, and even when the user's utterance deviates from the original topic, it is possible to respond to the user's utterance without causing the user to feel a failure of the story.

One example of the above-described agent is an chat-oriented dialogue system in which the agent performs an utterance in accordance with the utterance contents of the user so that the user and the agent perform a natural dialogue. For example, a dialogue system described in Non-patent literature 2 is a system that realizes an chat-oriented dialogue between the user and the system by the system performing an utterance while attaching greater importance to words specific to the context in a plurality of turns of dialogue engaged between the user and the agent, using a word included in an utterance of the user or the agent as a trigger and according to a rule described in advance. The rule used in the chat-oriented dialogue system is not limited to one described in advance but may be one automatically generated based on the user's utterance contents or may be one automatically generated based on the immediately preceding utterance by the user or the agent or an utterance performed in the vicinity thereof or may be one automatically generated based on an utterance at least including the immediately preceding utterance by the user or the agent or an utterance performed in the vicinity thereof. Non-patent literature 2 describes a technique for automatically generating a rule based on words in a co-occurrence relation or a dependency relation with words included in the utterance of the user. A dialogue system described, for example, in Non-patent literature 3 is a system whereby a manually described rule and a rule described using a statistical utterance generation technique are merged so as to reduce the rule generation cost. Unlike the scenario dialogue system, the chat-oriented dialogue system is not such a system that an agent performs an utterance along a scenario provided in advance, and so it is possible for the agent to perform an utterance at least based on utterance contents of the user, an immediately preceding utterance by the user or the agent or an utterance performed in the vicinity thereof or an immediately preceding utterance by the user or the agent or an utterance performed in the vicinity thereof without causing a situation in which the utterance by the agent does not correspond to the user's utterance depending on the user's utterance. That is, the chat-oriented dialogue system is a dialogue system in which the agent performs an utterance at least based on utterance contents of the user, an immediately preceding utterance by the user or the agent or an utterance performed in the vicinity thereof or an immediately preceding utterance by the user or the agent or an utterance performed in the vicinity thereof. These chat-oriented dialogue systems can explicitly respond to the user's utterance.

PRIOR ART LITERATURE

Non-Patent Literature

Non-patent literature 1: Tsunehiro Arimoto, Yuichiro Yoshikawa, Hiroshi Ishiguro, "Impression Evaluation of Dialogue without Voice Recognition by Plural Robots," Conference of the Robotics Society of Japan, 2016

Non-patent literature 2: Hiroaki Sugiyama, Toyomi Meguro, Ryuichiro Higashinaka, Yasuhiro Minami, "Leveraging Dependency Relations and Sentence Examples in Web-scale Corpus for Open-domain Utterance Generation," Transactions of the Japanese Society for Artificial Intelligence, vol. 30(1), pp. 183-194, 2015

Non-patent literature 3: Toyomi Meguro, Hiroaki Sugiyama, Ryuichiro Higashinaka, and Yasuhiro Minami, "Building a conversational system based on the fusion of rule-based and stochastic utterance generation," Proceedings of the $28^{th}$ Annual Conference of the Japanese Society for Artificial Intelligence, vol. 28, pp. 1-4, 2014

SUMMARY OF THE INVENTION

Problems to be Solved by the Invention

The chat-oriented dialogue system is basically based on a question and answer style, and so may not be able to continue a dialogue according to a consistent story. When the user's utterance is unexpected by a scenario, the conventional scenario dialogue system may not be able to respond to the user's utterance. Furthermore, with the dialogue system according to non-patent literature 1, the user may feel that the user's utterance is always misinterpreted or misunderstood.

In view of the above-described problems, it is an object of the present invention to provide a dialogue technique capable of improving a user's sense of participation in a topic and allowing a dialogue to be continued for a long time.

Means to Solve the Problems

In order to solve the above-described problems, a dialogue method according to a first aspect of the present invention is a dialogue method executed by a dialogue system that performs a dialogue with a user, the method comprising an utterance receiving step in which an input part receives an utterance performed by the user, a first presentation step in which a presentation part presents an utterance determined based on a scenario stored in advance, a second presentation step in which the presentation part presents an utterance determined based on the user's utterance contents, and a dialogue control step in which a dialogue control part performs control to execute a dialogue at least including a first dialogue flow which is a dialogue including the utterance receiving step and the first presentation step at least one time respectively based on a predetermined scenario, and a second dialogue flow which is a dialogue including the utterance receiving step and the second presentation step at least one time respectively.

A dialogue system according to a second aspect of the present invention is a dialogue system that performs a dialogue with a user, comprising an input part that receives an utterance performed by the user, an utterance determination part that determines a first utterance based on a scenario stored in advance and a second utterance based on the user's utterance contents, a presentation part that presents the first utterance determined by the utterance determination part and the second utterance determined by the utterance determination part, and a dialogue control part that performs control to execute a dialogue at least including a first dialogue flow which is a dialogue including receiving the utterance performed by the user and determining an utterance presented by the presentation part at least one time respectively based on a predetermined scenario, and a second dialogue flow which is a dialogue including receiving the utterance performed by the user and determining the utterance presented by the presentation part at least based on the utterance at least one time respectively.

A dialogue apparatus according to a third aspect of the present invention is a dialogue apparatus that determines an utterance presented by a dialogue system comprising an input part that receives an utterance performed by a user, an utterance determination part that determines an utterance presented by a presentation part, and the presentation part that presents the utterance determined by the utterance determination part, the dialogue apparatus comprising a dialogue control part that performs control to execute a dialogue at least including a first dialogue flow which is a dialogue including receiving the utterance performed by the user and determining the utterance presented by the presentation part at least one time respectively based on a predetermined scenario, and a second dialogue flow which is a dialogue including receiving the utterance performed by the user and determining the utterance presented by the presentation part at least based on the utterance at least one time respectively.

Effects of the Invention

According to the present invention, since switching of topics in the scenario dialogue is performed based on contents of an chat-oriented dialogue, the user is likely to have an illusion that the user's utterance also has contributed to the switching of topics and it is possible to improve the sense of participation in the topics although the switching of topics is actually based on only part of contents of the chat-oriented dialogue, and implement a dialogue system and a dialogue apparatus capable of continuing a dialogue with the user for a long time.

DETAILED DESCRIPTION OF THE EMBODIMENTS

Hereinafter, embodiments of the present invention will be described in detail. Note that in the drawings, components having identical functions are assigned identical reference numerals and overlapping description will be omitted.

First Embodiment

Figure 1:
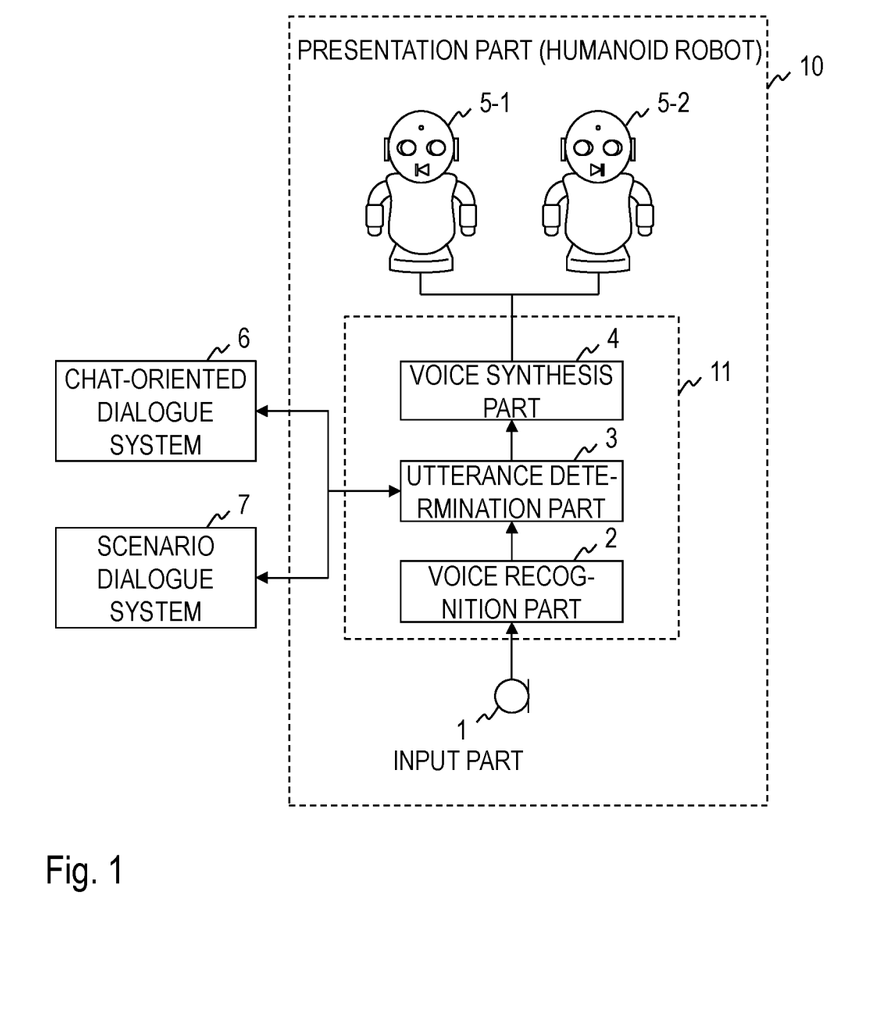
FIG. 1 is a diagram illustrating a functional configuration of a dialogue system by a humanoid robot according to a first embodiment.

A dialogue system according to a first embodiment is a system in which a plurality of humanoid robots operate in cooperation to have a dialogue with a user. That is, the dialogue system of the first embodiment is an example of a case where the agent is a humanoid robot. As shown in FIG. 1, a dialogue system 10 is provided with an input part 1, a voice recognition part 2, an utterance determination part 3, a voice synthesis part 4 and a presentation part 5. A dialogue method according to the first embodiment is implemented by this dialogue system 10 performing processes in respective steps which will be described later. Note that as shown in FIG. 1, a block composed of the voice recognition part 2, the utterance determination part 3 and the voice synthesis part 4 of the dialogue system 10 is referred to as a dialogue apparatus 11 of the first embodiment. The utterance determination part 3 is provided with an interface which allows communication with an chat-oriented dialogue system 6 and a scenario dialogue system 7 existing outside. The chat-oriented dialogue system 6 and the scenario dialogue system 7 may be configured inside the dialogue apparatus 11 as processing parts having similar functions. Note that the chat-oriented dialogue system 6 is an example of a dialogue system in which an agent performs an utterance at least based on the user's utterance contents and the scenario dialogue system 7 is an example of a dialogue system in which the agent performs an utterance based on a scenario stored in advance.

In order to improve a sense of response, the dialogue system 10 of the present embodiment presents the utterance determined by the chat-oriented dialogue system 6 based on the user's utterance in response to an open utterance and then presents the utterance determined by the scenario dialogue system 7 after the utterance determined by the chat-oriented dialogue system 6. Since the chat-oriented dialogue system 6 determines the utterance at least based on the user's utterance contents, it is possible to explicitly respond to the user's utterance. Therefore, it is possible to avoid an impression that only the user's remarks are always misinterpreted or misunderstood from being given to the user compared to a case where the dialogue system 10 simply chimes in with, for example, "I see." This can give the user an impression that the dialogue system 10 responds to the user in earnest and allows the user to continue the following scenario dialogue for a long time.

The dialogue apparatus 11 is a special apparatus configured with a special program read into a publicly known or dedicated computer including a central processing unit (CPU), a main storage apparatus (RAM: random access memory) or the like. The dialogue apparatus 11 executes each process under the control of, for example, the central processing unit. Data inputted to the dialogue apparatus 11 or data obtained through each process is stored in, for example, the main storage apparatus, the data stored in the main storage apparatus is read as required and used for other processes. Furthermore, at least part of each processing part of the dialogue apparatus 11 may be constructed of hardware such as an integrated circuit.

The input part 1 is an interface for the dialogue system 10 to acquire the user's utterance. In other words, the input part 1 is an interface for the user to input an utterance to the dialogue system 10. For example, the input part 1 is a microphone that collects an utterance voice performed by the user and converts it to a voice signal. The input part 1 inputs the voice signal of the user's collected utterance voice to the voice recognition part 2.

The voice recognition part 2 converts the voice signal of the user's utterance voice collected by the input part 1 to a text expressing the user's utterance contents. The voice recognition part 2 inputs the text expressing the user's utterance contents to the utterance determination part 3. Any existing voice recognition technique may be used for the voice recognition method and a method most fitted to the usage environment or the like may be selected as appropriate.

The utterance determination part 3 communicates with the chat-oriented dialogue system 6 or the scenario dialogue system 7 and determines a text expressing utterance contents from the dialogue system 10 in response to the user's utterance based on the inputted text. The utterance determination part 3 inputs the text expressing the determined utterance contents to the voice synthesis part 4.

The voice synthesis part 4 converts the text expressing the utterance contents determined by the utterance determination part 3 to a voice signal expressing the utterance contents. The voice synthesis part 4 inputs the voice signal expressing the utterance contents to the presentation part 5. Any existing voice synthesis technique may be used for the voice synthesis method and a method most fitted to the usage environment or the like may be selected as appropriate.

The presentation part 5 is an interface to present the utterance contents determined by the utterance determination part 3 to the user. For example, the presentation part 5 is a humanoid robot manufactured in imitation of a human figure. The humanoid robot pronounces the voice signal expressing the utterance contents converted to the voice signal by the voice synthesis part 4 from the text expressing the utterance contents determined by the utterance determination part 3, that is, the humanoid robot presents the utterance through a speaker mounted, for example, on the head. When a humanoid robot is used as the presentation part 5, one humanoid robot is provided for each personality participating in a dialogue. Hereinafter, as an example of two personalities participating in the dialogue, suppose there are two humanoid robots 5-1 and 5-2.

The input part 1 may be configured to be integrated with the presentation part 5. For example, when a humanoid robot is used for the presentation part 5, a microphone may be mounted on the head of the humanoid robot to be used as the input part 1.

Figure 2:
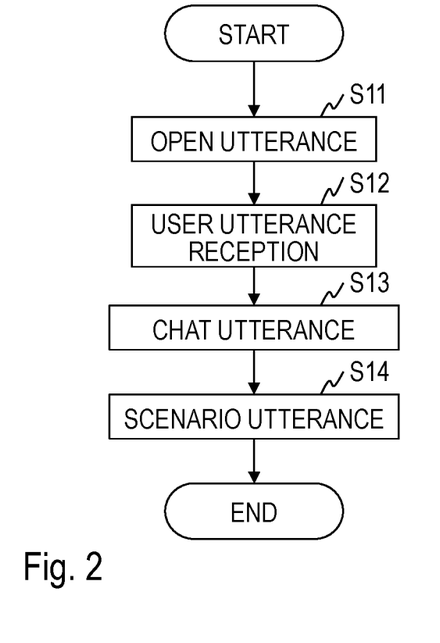
FIG. 2 is a diagram illustrating a processing procedure of the dialogue method according to the first embodiment.

Hereinafter, a processing procedure for the dialogue method according to the first embodiment will be described with reference to FIG. 2.

In step S11, the humanoid robot 5-1 or 5-2 outputs a voice expressing contents of an open utterance selected by the scenario dialogue system 7 or the chat-oriented dialogue system 6 from the speaker. The "open utterance" refers to an utterance to which the partner can freely respond and is an utterance including at least any one of an open question and an open comment. The "open question" refers to a question to which the partner can freely respond such as so-called 5W1H (when, where, who, what, why and how). The opposite of an open question is called a "closed question," a reply range of which is limited such as "Yes/No" or "A or B or C." The "open comment" refers to a remark that does not particularly ask for an answer such as a rambling remark on a topic or a remark that does not particularly ask for an answer, that is, an utterance that the partner can freely perform. A text expressing contents of an open utterance is determined along a scenario selected by the scenario dialogue system 7 at the request of the utterance determination part 3. The scenario dialogue system 7 may randomly select a scenario from among a plurality of scenarios provided in advance or select a scenario according to a predetermined rule based on dialogue contents of up to an immediately preceding dialogue. Examples a method of selecting a scenario based on dialogue contents of up to the immediately preceding dialogue include a method of selecting a scenario in which an inter-word distance between words included in each utterance or focus words constituting each utterance and words or focus words included in each scenario is smaller than a predetermined distance regarding a dialogue including five immediately preceding utterances or so.

In step S12, the microphone 1 receives the user's utterance in response to the open utterance. The voice recognition part 2 recognizes a voice signal of the user's utterance voice collected by the microphone 1 and inputs a text obtained as a voice recognition result to the utterance determination part 3 as the text expressing the user's utterance contents.

In step S13, the humanoid robot 5-1 outputs a voice expressing contents of the chat utterance determined by the chat-oriented dialogue system 6 based on the text expressing the user's utterance contents from the speaker. The utterance determination part 3 determines the text expressing contents of the chat utterance based on the text expressing the user's utterance contents which are the voice recognition result of the user's utterance using the chat-oriented dialogue system 6. The humanoid robot that outputs the voice expressing contents of the chat utterance may be a humanoid robot that outputs the voice expressing contents of the open utterance or may be a humanoid robot different from the humanoid robot that outputs the voice expressing contents of the open utterance.

In step S14, the humanoid robot 5-2 outputs the voice expressing contents of the scenario utterance determined by the scenario dialogue system 7 from the speaker. Step S14 is executed after step S13. That is, the dialogue system outputs the voice expressing contents of the chat utterance determined by the chat-oriented dialogue system 6 based on the user's utterance from the speaker, and then outputs the voice expressing contents of the scenario utterance determined by the scenario dialogue system 7 from the speaker. The utterance determination part 3 determines the text expressing contents of the scenario utterance along the scenario selected by the scenario dialogue system 7 at the request of the utterance determination part 3. The humanoid robot that outputs the voice expressing contents of the scenario utterance may be a humanoid robot that outputs the voice expressing contents of the open utterance or may be a humanoid robot different from the humanoid robot that outputs the voice expressing contents of the open utterance. Hereinafter, the dialogue system outputs the voice expressing utterance contents of the scenario utterance determined by the scenario dialogue system 7 from the speaker so that a dialogue along the scenario is executed between the user and the dialogue system. The humanoid robot that performs subsequent utterances may be any one humanoid robot or a plurality of humanoid robots.

Hereinafter, a more specific example of dialogue contents according to the first embodiment will be described. Here, "R" represents a humanoid robot and "H" represents a user. A number in parentheses after "R" is an identifier of the humanoid robot. "R(1→H)" means that the humanoid robot 5-1 performs an utterance with the intention to engage a dialogue with the user and "R(1→2)" means that the humanoid robot 5-1 performs an utterance with the intention to engage a dialogue with the humanoid robot 5-2. Note that to whom the humanoid robot intends to talk may be expressed by motion of the head or sight line of the humanoid robot or may not be expressed at all.

R(1→H): "What kind of food do you like?" (*2)
H: "I like Ramen!"
R(1→H): "I'd like to eat Tonkotsu Ramen." (*1)
R(2→1): "Because we are robots, we cannot eat anything." (*2)
R(1→2): "It cannot be helped." (*2)
R(2→1): "I see." (*2)

Here, "*1" means utterance contents determined by the chat-oriented dialogue system 6. "*2" means utterance contents determined by the scenario dialogue system 7. Note that the utterance of the humanoid robot from *1 onward may be the utterance of the opposite humanoid robot, or the dialogue partner may be a human or another humanoid robot or both a human and another humanoid robot.

According to the dialogue technique of the present embodiment with the above-described configuration, even when the user's utterance in response to the open utterance is unexpected by the scenario, the chat-oriented dialogue system can respond to the user's utterance appropriately, and so the sense of response perceived by the user improves. This motivates the user to continue the dialogue with the system and allows the user to continue the dialogue for a long time.

First Modification of First Embodiment

Although an example has been described in the first embodiment where an open utterance selected by the scenario dialogue system 7 is outputted from the speaker in step S11, the open utterance outputted from the speaker in step S11 may be generated in any way.

For example, the input part 1 may collect the user's utterance performed before step S11 and convert it to a voice signal, the voice recognition part 2 may obtain a text expressing the user's utterance contents, the utterance determination part 3 may determine the text expressing the utterance contents of the open utterance through the chat-oriented dialogue system 6 at least based on the text expressing the user's utterance contents and output a voice signal expressing utterance contents of the open utterance determined by the chat-oriented dialogue system 6 from the speaker.

Second Modification of First Embodiment

Although an example has been described in the first embodiment where a voice expressing contents of the chat utterance determined by the chat-oriented dialogue system 6 based on the user's utterance is outputted from the speaker in step S13, that is, a voice expressing contents of one chat utterance determined by the chat-oriented dialogue system 6 in step S13 is outputted from the speaker, a voice expressing contents of a plurality of chat utterances determined by the chat-oriented dialogue system 6 in step S13 may be outputted from the speaker.

For example, in step S13, the humanoid robot 5-1 may first output the voice expressing contents of the chat utterance determined by the chat-oriented dialogue system 6 based on the user's utterance from the speaker and the humanoid robot 5-2 may output the voice expressing contents of the chat utterance determined by the chat-oriented dialogue system 6 based on the utterance of the humanoid robot 5-1 outputted from the speaker.

Third Modification of First Embodiment

Although the dialogue system 10 according to the first embodiment is a system in which a plurality of humanoid robots operate in cooperation to have a dialogue with the user, the system may be such that one humanoid robot performs a whole or part of dialogue with the user. For example, one humanoid robot may utter the open utterance in step S11, the chat utterance determined by the chat-oriented dialogue system 6 based on the user's utterance in step S13 and the scenario utterance determined by the scenario dialogue system 7 in step S14. In this case, for example, the dialogue with the user from step S14 onward may be performed by a plurality of humanoid robots in cooperation or may be performed by the one same humanoid robot as that up to step S14.

Second Embodiment

In a second embodiment, in order to improve the user's sense of participation in a topic, a change is made from a scenario dialogue to an chat-oriented dialogue, and then a change is made from the chat-oriented dialogue to the scenario dialogue again. Inserting the chat-oriented dialogue between the scenario dialogues makes the dialogue flow more natural and can give the user a sense that the user is also participating in the determination of the topic. This also allows the user to continue the dialogue for a long time also in the scenario dialogue along that follows that.

Figure 3:
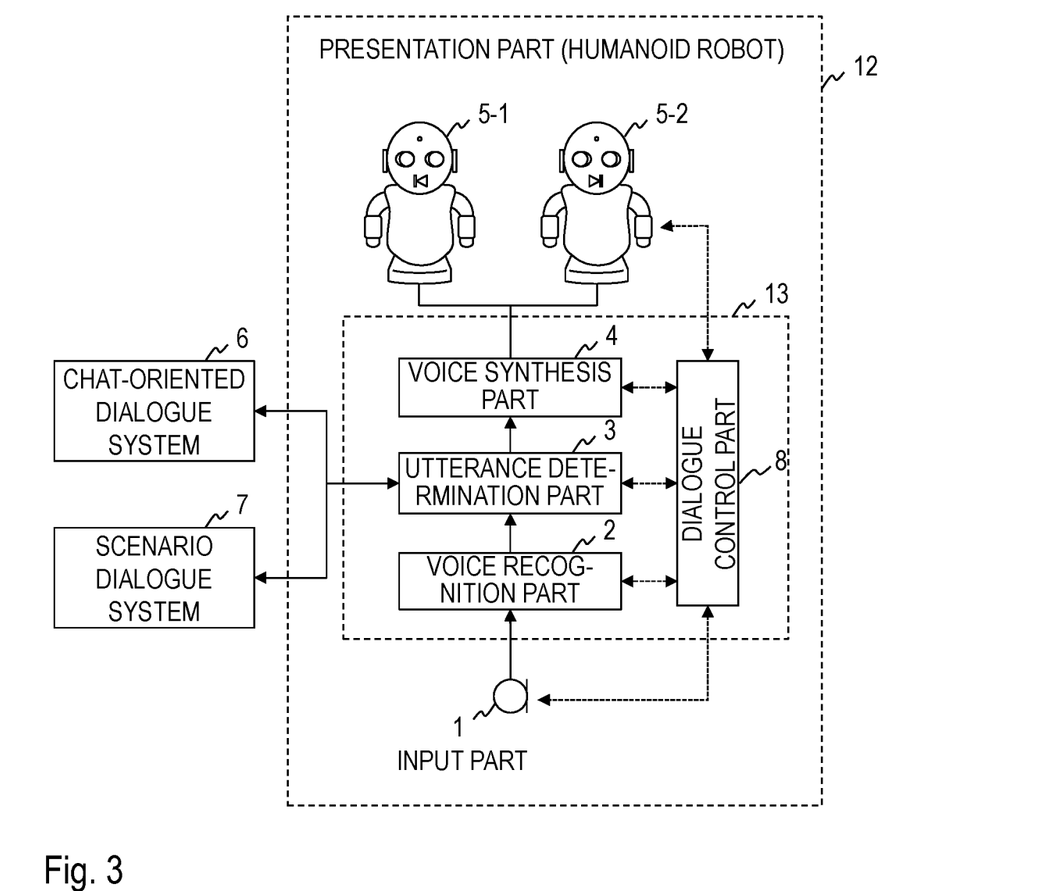
FIG. 3 is a diagram illustrating a functional configuration of a dialogue system by a humanoid robot according to a second embodiment.

As shown in FIG. 3, a dialogue system 12 according to the second embodiment is provided with the input part 1, the voice recognition part 2, the utterance determination part 3, the voice synthesis part 4 and the presentation part 5 as in the case of the first embodiment, and is further provided with a dialogue control part 8. A dialogue method according to the second embodiment is implemented by this dialogue system 12 executing processes in the respective steps which will be described later. Note that as shown in FIG. 3, a block composed of the voice recognition part 2, the utterance determination part 3, the voice synthesis part 4 and the dialogue control part 8 in the dialogue system 12 is referred to as a dialogue apparatus 13 of the second embodiment. The dialogue control part 8 controls other processing parts provided for the dialogue system 12 to execute a dialogue flow which is a dialogue in which reception of the user's utterance and presentation of an utterance to the user are each executed at least one time.

Figure 4:
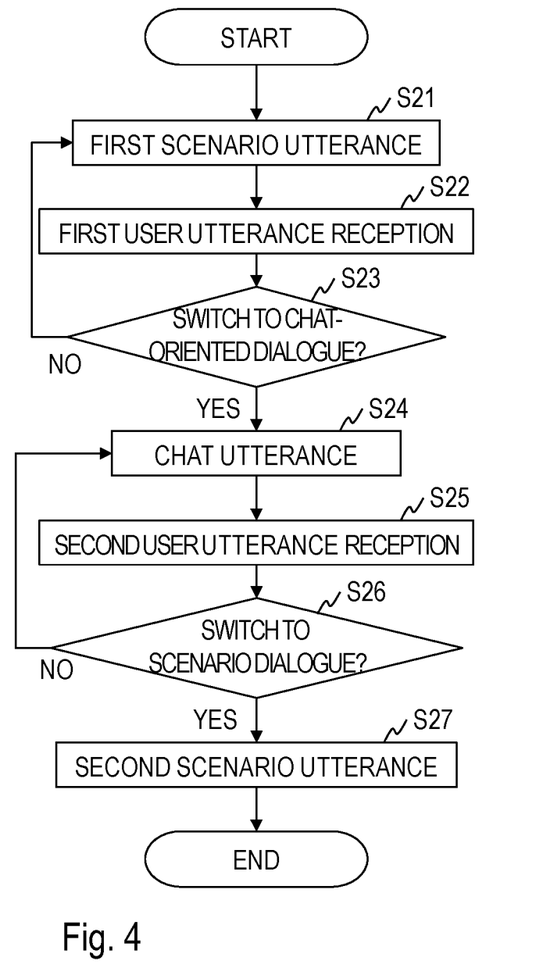
FIG. 4 is a diagram illustrating a processing procedure of the dialogue method according to the second embodiment.

Hereinafter, a processing procedure for the dialogue method according to the second embodiment will be described with reference to FIG. 4.

In step S21, the humanoid robot 5-1 or 5-2 outputs a voice expressing contents of a first scenario utterance included in a first scenario arbitrarily selected by the scenario dialogue system 7 from the speaker. The selection of the first scenario is performed triggered by a request of the utterance determination part 3. The scenario dialogue system 7 may also randomly select the first scenario from among a plurality of scenarios prepared in advance or may select the first scenario according to a predetermined rule based on previous dialogue contents. The method for the scenario dialogue system 7 to select the first scenario is similar to the method described in step S11 of the first embodiment.

In step S22, the microphone 1 receives the first user utterance performed by the user in response to the first scenario utterance. The voice recognition part 2 recognizes a voice signal of the user's utterance collected by the microphone 1 and inputs a text obtained as a voice recognition result to the utterance determination part 3 as a text expressing contents of the first user utterance.

In step S23, the dialogue system 12 determines whether or not a condition for switching from a scenario dialogue to an chat-oriented dialogue is satisfied. The dialogue system 12 proceeds the process to step S24 when it is determined that the condition is satisfied. The dialogue system 12 returns the process to step S21 to re-execute the processes in steps S21 and S22 when it is determined that the condition is not satisfied.

Examples of the condition for switching the scenario dialogue to the chat-oriented dialogue include A1: a case where the whole dialogue along the first scenario is completed and A2: a case where the progress of the first scenario fails. Examples of the case where the progress of the scenario fails include A2-1: a case where the user's utterance after the utterance performed to the user is not included in the estimated range of the scenario dialogue system and A2-2: a case where the user's intention of not wanting to talk about the scenario is recognized or the user's desire for the dialogue is recognized to be declining, from the user's behavior about the scenario in progress. Furthermore, A2-1 and A2-2 may be combined and a case where the user' reaction after the utterance performed to the user is unfavorable is also included. The case where the user's utterance is not included in the estimated range of the scenario dialogue system is, for example, a case where the user's utterance does not match an utterance determined for the user's utterance based on the scenario stored in advance by the scenario dialogue system. Examples of the user's behavior include a non-language signal and a para-language signal (including information on pause). Examples of the case where the user's reaction is unfavorable include a case where the user's intention of not wanting to talk about the scenario is recognized from the user's behavior or a decline of the user's desire for the dialogue is recognized. The recognition of the intention of not wanting to talk or the decline of the user's desire for the dialogue may be judged from an utterance of a specific phrase (for example, "You did this topic a while ago") predetermined by the user as a sign of expressing the user's intention of not wanting to talk about that topic further.

In step S24, the humanoid robot 5-1 or 5-2 outputs a voice expressing contents of an chat utterance determined by the chat-oriented dialogue system 6 based on the text expressing contents of the first user utterance from the speaker. The humanoid robot that outputs the voice expressing contents of the chat utterance may be a humanoid robot that outputs the voice expressing contents of the last utterance of one or more utterances based on the first scenario or may be a humanoid robot different from the humanoid robot that outputs the voice expressing contents of the last utterance.

The text expressing contents of the chat utterance is determined by the utterance determination part 3 using the chat-oriented dialogue system 6 based on the text expressing contents of an utterance sequence which is a voice recognition result of an utterance sequence between the humanoid robot and the user in the middle of a dialogue along the first scenario. The range of the utterance sequence to be inputted to the chat-oriented dialogue system 6 may be limited to the immediately preceding utterance or part or whole of the first scenario, or the whole chat-oriented dialogue or scenario dialogue conducted before the first scenario may be included. A first utterance when the utterance is switched to the chat-oriented dialogue may be set in advance for each scenario. For example, a question such as "Besides eating, what do you like?" may be provided after the scenario of talking about food.

In step S25, the microphone 1 receives a second user utterance performed by the user in response to the chat utterance. The voice recognition part 2 recognizes a voice signal of the second user utterance collected by the microphone 1 and inputs the text obtained as a voice recognition result to the utterance determination part 3 as the text expressing contents of the second user utterance.

In step S26, the dialogue system 12 determines whether or not the condition for switching from the chat-oriented dialogue to the scenario dialogue is satisfied. Upon determining that the condition is satisfied, the dialogue system 12 proceeds the process to step S27. Upon determining that the condition is not satisfied, the dialogue system 12 returns the process to step S24 and re-executes the processes in steps S24 and S25.

Examples of the condition for switching from the chat-oriented dialogue to the scenario dialogue include B1: a case where it is difficult to continue the chat-oriented dialogue and B2: a case where there is a situation in which it is possible to select the next scenario with sufficient reliability through an chat-oriented dialogue. Examples of the case where it is difficult to continue the chat-oriented dialogue include B1-1: a case where the user's utterance after being performed to the user is not included in the estimated range of the chat-oriented dialogue system, B1-2: a case where the user's intention of not wanting to talk about the scenario is recognized or the user's desire for the dialogue is recognized to be declining from the user's behavior toward the chat-oriented dialogue in progress and B1-3: a case where there is not a situation in which it is not possible to select the next scenario with sufficient reliability and chat utterances are repeated a predetermined number of times. This also includes a case combining B1-1 and B1-2 where the user's reaction after performing an utterance to the user is unfavorable. The case of B1-3 can be combined with the case of B1-1 and/or the case of B1-2, and B1-3 can be configured to judge that it is difficult to continue the chat-oriented dialogue when, for example, the user's utterance is not included in an estimated range of the chat-oriented dialogue system and/or when the user's intention of not wanting to talk is recognized from the user's behavior a predetermined number of times repeatedly. The case where the user's utterance is not included in the estimated range of the chat-oriented dialogue system is, for example, a case where the user's utterance does not match the utterance determined by the chat-oriented dialogue system at least based on the user's utterance. Examples of the user's behavior include a non-language signal and a para-language signal (including information on pause). Examples of the case where the user's reaction is unfavorable include a case where the user's intention of not wanting to talk is recognized from the user's behavior or a decline of the user's desire for the dialogue is recognized. The recognition of the intention of not wanting to talk or the decline of the user's desire for the dialogue may be judged from an utterance of a specific phrase (for example, "You did this topic a while ago") predetermined by the user.

When switching to the scenario dialogue, it is preferable to receive the immediately preceding user's utterance with a nod of the head saying, for example, "I see," insert a pause immediately before the first utterance and cause a humanoid robot different from the humanoid robot performing an utterance at the end of the chat-oriented dialogue to perform an utterance expressing an intention to change the topic such as "By the way", "Oh yeah" or "Hey." This makes it possible to alleviate an uncomfortable feeling caused by discontinuity between the topics. At this time, contents of the utterance may be changed in accordance with reliability when the next scenario is selected. Here, the "reliability of selection" refers to an index indicating a level of similarity between the contents of the chat-oriented dialogue and the selected scenario. For example, when the reliability of selection is relatively high, a short utterance such as "Oh yeah, . . . " may be inserted or when the reliability of selection is relatively low, contents explicitly expressing that the topic is changed such as "By the way, although it may not be related at all . . . " may be uttered. A specific example of the case where the reliability of selection is low can be a case where after uttering "I ate Ramen" in an chat-oriented dialogue, "restaurant management" is brought up as a topic in a scenario dialogue suggesting that similarity between a topic word and a topic predicate is low. Another example may be a case where although similarity between topics is high, the user is negative about the topic such as after uttering "I don't like sports" in an chat-oriented dialogue, an utterance "I skied" is brought up as a topic in a scenario dialogue. Furthermore, there may be a case where the topic word is a multi-sense word and it is not distinguishable in what sense the utterance is performed, for example, in a case where an utterance about "drug (drag)" is performed in an chat-oriented dialogue and it is not distinguishable whether the utterance is related to a topic of "drag" of the mouse or a topic of "drug" of medicine.

In step S27, the humanoid robot 5-1 or 5-2 outputs a voice expressing contents of the second scenario utterance included in the second scenario selected by the scenario dialogue system 7 from the speaker. The second scenario is selected at the request of the utterance determination part 3 as a trigger. In step S23, when the scenario dialogue is switched to the chat-oriented dialogue before the first scenario is completed, the remaining part of the first scenario may be assumed as the second scenario. Thereafter, a dialogue along the second scenario is performed between the user and the dialogue apparatus.

The scenario dialogue system 7 selects the second scenario according to a predetermined rule based on contents of the chat-oriented dialogue carried out in steps S24 and S25. Since the utterance in the chat-oriented dialogue is assumed to include phrases expressing topics in which the user can take interest, it is possible to select a scenario relating to an appropriate topic as a second scenario using these phrases as clues. For example, keywords representing a topic are set in each scenario and a scenario is selected according to similarity between one or both of the utterance of the humanoid robot in the chat-oriented dialogue and the user's utterance, and their keywords. Furthermore, when, for example, a sentence generated by the chat-oriented dialogue system 6 in response to the user's utterance is similar to a starting sentence of any one scenario, the scenario is selected.

When a selection using the utterance in the chat-oriented dialogue as a clue is not possible and it is determined that it is difficult to continue the dialogue, a second scenario is randomly selected from among a plurality of scenarios prepared in advance. In this case, when scenarios are prepared in advance, a selection probability may be set for each scenario. That is, it is not always necessary to perform uniform random selection. In addition, the selection probability may be weighted based on similarities calculated from observation information so far.

Steps in the dialogue method according to the second embodiment are executed under the control of the dialogue control part 8. The dialogue control part 8 implements the dialogue method according to the second embodiment by performing control to execute a first dialogue flow of executing step S21 of presenting contents of the first scenario utterance based on the first scenario determined by the scenario dialogue system 7 and step S22 of receiving a first user utterance performed by the user to the first scenario utterance, one or more times respectively, and execute a second dialogue flow of executing step S24 of presenting contents of the chat utterance determined by the chat-oriented dialogue system 6 based on the user's utterance and step S25 of receiving a second user utterance performed by the user to the chat utterance, one or more times respectively.

A specific example of the dialogue contents of the second embodiment will be described hereinafter. Here, "R" represents a humanoid robot and "H" represents a user. A number in parentheses after "R" represents an identifier of the humanoid robot. As in the case of the first embodiment, to whom the humanoid robot has an intention to talk may or may not be expressed, for example, by motion of the head or the sight line of the humanoid robot.

R(1→2): "What kind of food do you like?" (*1: This corresponds to utterance contents determined based on the first scenario selected by the scenario dialogue system 7)

R(2→1): "I like sushi" (*1: This corresponds to utterance contents determined based on the first scenario selected by the scenario dialogue system 7)

H: "We just talked about this topic a while ago" (*: This corresponds to a specific example of "A2-2: a case where the user's intention of not wanting to talk about the scenario is recognized from the user's behavior toward the scenario in progress")

R(1→H): "Besides eating, what do you like?" (*1: This corresponds to a specific example of the utterance included in the first scenario selected by the scenario dialogue system 7 based on "food" which is the previous dialogue contents)

H: "Reading."

R(1→H): "What is your favorite genre of books?" (*2: This corresponds to a specific example of the utterance determined by the chat-oriented dialogue system 6 based on "reading" of the user utterance)

H: "I like sports comics"

R(2→H): "Do you often play sports?" (*2: This corresponds to a specific example where an chat-oriented dialogue is repeated a plurality of times. Here, the chat-oriented dialogue system 6 determines utterance contents based on "sports" in the user utterance)

H: "I don't like sports so much"

R(2→H): "I see" (*3: This corresponds to a specific example of a case where it is determined that it is difficult to continue the chat-oriented dialogue "B1-2: when the user's intention of not wanting to talk about the scenario is recognized from the user's behavior toward the chat-oriented dialogue in progress." Since the user denies the topic saying "I don't like sports so much," it is determined that it is difficult to continue the chat-oriented dialogue. Here, the user's immediately preceding utterance is received with a nod of the head first.)

R(1→2): "By the way, I skied the other day" (*3: By uttering "By the way" expressing an intention of changing the topic first, the utterance included in the second scenario selected by the scenario dialogue system 7 based on "sports" which corresponds to contents of the chat-oriented dialogue is uttered)

R(2→1): "I'm afraid skiing may be difficult with your body shape?" (*3: This corresponds to a specific example of the utterance included in the second scenario selected by the scenario dialogue system 7 based on "sports" which are contents of the chat-oriented dialogue)

According to the dialogue technique of the present embodiment configured as described above, after a certain scenario dialogue ends, the topic of the next scenario dialogue is determined according to contents of the chat-oriented dialogue, and so the sense of participation in the dialogue perceived by the user improves. This increases motivation of the user for continuing the dialogue with the dialogue system and allows the user to continue the dialogue for a long time.

Modification

An example has been described in the aforementioned embodiment where robots are used as agents and a dialogue is performed with voices. However, the robots in the aforementioned embodiment may be humanoid robots having physical bodies or the like or robots without physical bodies. The dialogue technique of the invention is not limited to the above-described techniques, but may be a mode in which a dialogue is performed using agents without any entity like a physical body as a humanoid robot, not provided with any utterance mechanism. One such example may be a mode in which a dialogue is performed using an agent displayed on a screen of a computer. More specifically, in group chats in which a plurality of accounts perform dialogues using text messages such as "LINE" (registered trademark) and "2-channel" (registered trademark), the present dialogue technique is applicable to a mode in which a dialogue is performed between the user's account and an account of a dialogue apparatus. In this mode, the computer having a screen displaying agents needs to be located in the vicinity of a human, but the computer and the dialogue apparatus may be connected together via a network such as the Internet. That is, the present dialogue system is applicable not only to a dialogue in which speakers such as a human and a robot speak face to face, but also to a dialogue in which speakers communicate with each other through a network.

Figure 5:
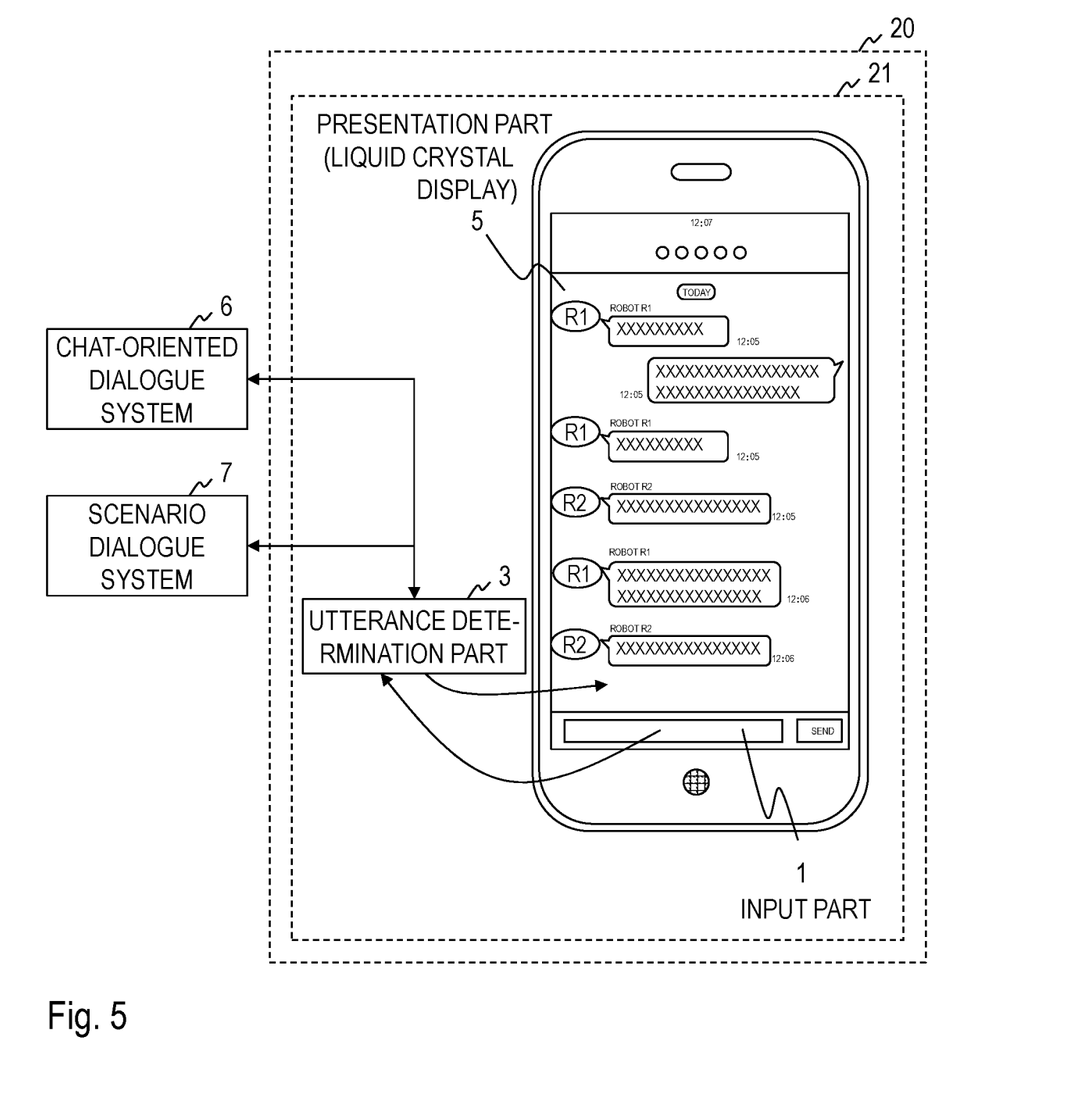
FIG. 5 is a diagram illustrating a functional configuration of the dialogue system by a group chat according to the first embodiment.

As shown in FIG. 5, a dialogue system 20 according to a modification is provided with an input part 1, an utterance determination part 3 and a presentation part 5. In the example in FIG. 5, the dialogue system 20 of the modification is made up of one dialogue apparatus 21 and the dialogue apparatus 21 of the modification is provided with the input part 1, the utterance determination part 3 and the presentation part 5. The utterance determination part 3 is provided with an interface that allows communication with the chat-oriented dialogue system 6 and the scenario dialogue system 7 existing outside. The chat-oriented dialogue system 6 and the scenario dialogue system 7 may be configured in the dialogue apparatus as a processing part having functions similar to those of the chat-oriented dialogue system 6 and the scenario dialogue system 7.

Examples of the dialogue apparatus according to the modification include a mobile terminal such as smartphone and a tablet or an information processing apparatus such as desktop or lap top personal computer. The following description is given assuming that the dialogue apparatus is a smartphone. The presentation part 5 is a liquid crystal display provided for the smartphone. A window of chat application is displayed on this liquid crystal display and dialogue contents of the group chat are displayed in the window in time-series order. The "group chat" is a function whereby a plurality of accounts in a chat mutually contributes text messages and advances a dialogue. Suppose a plurality of virtual accounts corresponding to virtual characters controlled by the dialogue apparatus and the user's account participate in this group chat. That is, the present modification is an example of a case where the agent is a virtual account displayed on the liquid crystal display of the smartphone which is the dialogue apparatus. The user enters utterance contents into the input part 1 using a software keyboard and can contribute the utterance contents to the group chat through the own account. The utterance determination part 3 enters the contribution from the user's account into an chat-oriented dialogue system 6 or a scenario dialogue system 7 and contributes the utterance contents obtained from each dialogue system to the group chat through each virtual account. Note that a configuration may also be adopted in which the user enters the utterance contents into the input part 1 by means of an utterance using a microphone and the voice recognition function mounted on the smartphone. Furthermore, a configuration may also be adopted in which utterance contents obtained from each dialogue system using a speaker and the voice synthesis function mounted on the smartphone are outputted in voice corresponding to each virtual account from the speaker.

Note that when utterances of the agents are displayed on the presentation part 5 (display) simultaneously, the utterances may be favorably perceived as being engaged actively or heating up, however, on the other hand, when a greater amount of text than the user can read at a time is presented, the user may be likely to consider it difficult to continue the dialogue, and so utterances may be displayed one by one depending on the situation in which the dialogue is used in a scene where an acknowledgment load cannot be placed on the user or a scene where a calm atmosphere is required. Note that when utterances are displayed one by one, utterances may be displayed at a predetermined time interval. The time interval may be fixed or variable.

The embodiments of the present invention have been described so far, but the specific configurations thereof are not limited to these embodiments, and it goes without saying that even when there are changes or the like as appropriate in design without departing from the spirit and scope of the present invention, such changes are included in the present invention. The various processes described in the embodiments may not only be executed in time-series order according to the described order, but also be executed in parallel or individually according to a processing capacity of the apparatus that executes the processes or as required.

[Program, Recording Medium]

In the case that the various processing functions of the dialogue apparatuses described in the above-described embodiment are implemented by a computer, processing contents of the functions that should be possessed by the dialogue apparatuses are described by a program. Furthermore, in the case that the various processing functions of the dialogue system described in the above-described modification are implemented by a computer, the processing contents that should be possessed by the dialogue system are described by a program. The various processing functions in the dialogue apparatus and the dialogue system are implemented on the computer by causing the computer to execute this program.

The program that describes the processing contents can be recorded in a computer-readable recording medium. Examples of the computer-readable recording medium include a magnetic recording apparatus, an optical disk, a magneto-optical recording medium, a semiconductor memory or any medium.

This program is circulated through, for example, sales, transfer or rent of a portable recording medium such as DVD, CD-ROM that records the program. The program may also be configured to be circulated by storing the program in a storage apparatus of a server computer, and transferring the program from the server computer to another computer.

The computer that executes such a program temporarily stores a program recorded in a portable storage medium or a program transferred from the server computer in the own storage apparatus. At the time of execution of the process, this computer reads the program stored in the own storage apparatus and executes the process according to the read program. As another execution mode of the program, the computer may read the program directly from a portable recording medium and may execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program in the present mode includes a semi-program which is information used for processing by a computer (data which is not a direct instruction on the computer but has a characteristic of defining processing of the computer).

Although in this mode, the present apparatus is configured by executing a predetermined program on the computer, at least some of these processing contents may be implemented by hardware.

What is claimed is:

1. A dialogue method executed by a dialogue system that performs a dialogue with a user, the method comprising:
   a first utterance receiving step in which an input part receives a first user utterance which is an utterance performed by the user;
   a first presentation step in which a presentation part presents an utterance provided in a pre-stored scenario, wherein the utterance provided in the pre-stored scenario is presented in response to the first user utterance;
   a second utterance receiving step in which an input part receives a second user utterance which is an utterance performed by the user;
   a second presentation step in which the presentation part presents an utterance explicitly responding to the second user utterance; and
   a dialogue control step in which a dialogue control part performs control at least including:
   a first dialogue flow which is a dialogue consisted of the first utterance receiving step and the first presentation step at least one time respectively; and
   a second dialogue flow which is a dialogue consisted of the second utterance receiving step and the second presentation step at least one time respectively, wherein the control includes at least one of:
executing the dialogue of the first dialogue flow and the dialogue of the second dialogue flow sequentially; and
executing the dialogue of the second dialogue flow and the dialogue of the first dialogue flow sequentially,
wherein
when the first dialogue flow is executed immediately after the second dialogue flow, selection criteria for selecting one scenario from among a plurality of pre-stored scenarios as a scenario of the first dialogue flow comprise criteria based on utterance contents of the second dialogue flow,
the plurality of pre-stored scenarios are stored with information indicating likelihood of selection of each scenario associated with each scenario, and
the selection criteria are criteria according to which a selection is performed based on the likelihood when a selection of one scenario from among the plurality of pre-stored scenarios based on utterance contents of the second dialogue flow is judged to be inappropriate.

2. A dialogue system that performs a dialogue with a user, comprising:
an input part that receives a first utterance performed by the user and a second user utterance performed by the user;
an utterance determination part that determines a first utterance provided in a pre-stored scenario and a second utterance explicitly responding to the second user utterance;
a presentation part that presents the first utterance determined by the utterance determination part in response to the first user utterance and the second utterance determined by the utterance determination part; and
a dialogue control part that performs control at least including:
a first dialogue flow which is a dialogue consisted of receiving the first user utterance performed by the user and determining the first utterance presented by the presentation part at least one time respectively; and
a second dialogue flow which is a dialogue consisted of receiving the second user utterance performed by the user and determining the second utterance presented by the presentation part at least one time respectively,
wherein the control includes at least one of:
executing the dialogue of the first dialogue flow and the dialogue of the second dialogue flow sequentially; and
executing the dialogue of the second dialogue flow and the dialogue of the first dialogue flow sequentially,
wherein
when the first dialogue flow is executed immediately after the second dialogue flow, selection criteria for selecting one scenario from among a plurality of pre-stored scenarios as a scenario of the first dialogue flow comprise criteria based on utterance contents of the second dialogue flow,
the plurality of pre-stored scenarios are stored with information indicating likelihood of selection of each scenario associated with each scenario, and
the selection criteria are criteria according to which a selection is performed based on the likelihood when a selection of one scenario from among the plurality of pre-stored scenarios based on utterance contents of the second dialogue flow is judged to be inappropriate.

3. A dialogue apparatus that determines an utterance presented by a dialogue system comprising an input part that receives a first user utterance performed by a user and a second user utterance performed by the user, an utterance determination part that determines a first utterance provided in a pre-stored scenario and a second utterance explicitly responding to the second user utterance, and a presentation part that presents the first utterance determined by the utterance determination part in response to the first user utterance and the second utterance determined by the utterance determination part, the dialogue apparatus comprising a dialogue control part that performs control at least including:
a first dialogue flow which is a dialogue consisted of receiving the first user utterance performed by the user and determining the first utterance presented by the presentation part at least one time respectively; and
a second dialogue flow which is a dialogue consisted of receiving the second user utterance performed by the user and determining the second utterance presented by the presentation part at least one time respectively,
wherein the control includes at least one of:
executing the dialogue of the first dialogue flow and the dialogue of the second dialogue flow sequentially; and
executing the dialogue of the second dialogue flow and the dialogue of the first dialogue flow sequentially,
wherein
when the first dialogue flow is executed immediately after the second dialogue flow, selection criteria for selecting one scenario from among a plurality of pre-stored scenarios as a scenario of the first dialogue flow comprise criteria based on utterance contents of the second dialogue flow,
the plurality of pre-stored scenarios are stored with information indicating likelihood of selection of each scenario associated with each scenario, and
the selection criteria are criteria according to which a selection is performed based on the likelihood when a selection of one scenario from among the plurality of pre-stored scenarios based on utterance contents of the second dialogue flow is judged to be inappropriate.

4. A non-transitory computer readable recording medium including computer executable instructions that make a dialogue system perform a dialogue method, wherein the dialogue system performs a dialogue with a user, the dialogue method comprising:
a first utterance receiving step in which an input part receives a first user utterance which is an utterance performed by the user;
a first presentation step in which a presentation part presents an utterance provided in a pre-stored scenario, wherein the utterance provided in the pre-stored scenario is presented in response to the first user utterance;
a second utterance receiving step in which an input part receives a second user utterance which is an utterance performed by the user;
a second presentation step in which the presentation part presents an utterance explicitly responding to the second user utterance; and
a dialogue control step in which a dialogue control part performs control at least including:
a first dialogue flow which is a dialogue consisted of the first utterance receiving step and the first presentation step at least one time respectively; and
a second dialogue flow which is a dialogue consisted of the second utterance receiving step and the second presentation step at least one time respectively,
wherein the control includes at least one of:
executing the dialogue of the first dialogue flow and the dialogue of the second dialogue flow sequentially; and executing the dialogue of the second dialogue flow and the dialogue of the first dialogue flow sequentially, wherein when the first dialogue flow is executed immediately after the second dialogue flow, selection criteria for selecting one scenario from among a plurality of pre-stored scenarios as a scenario of the first dialogue flow comprise criteria based on utterance contents of the second dialogue flow, the plurality of pre-stored scenarios are stored with information indicating likelihood of selection of each scenario associated with each scenario, and the selection criteria are criteria according to which a selection is performed based on the likelihood when a selection of one scenario from among the plurality of pre-stored scenarios based on utterance contents of the second dialogue flow is judged to be inappropriate.

5. A non-transitory computer readable recording medium including computer executable instructions that make a dialogue apparatus perform a dialogue method that determines an utterance presented by a dialogue system comprising an input part that receives a first user utterance performed by a user and a second user utterance performed by the user, an utterance determination part that determines a first utterance provided in a pre-stored scenario and a second utterance explicitly responding to the second user utterance, and a presentation part that presents the first utterance determined by the utterance determination part in response to the first user utterance and the second utterance determined by the utterance determination part, the method comprising:

a dialogue control step in which a dialogue control part performs control at least including:

a first dialogue flow which is a dialogue consisted of receiving the first user utterance performed by the user and determining the first utterance presented by the presentation part at least one time respectively; and a second dialogue flow which is a dialogue consisted of receiving the second user utterance performed by the user and determining the second utterance presented by the presentation part at least one time respectively, wherein the control includes at least one of:

executing the dialogue of the first dialogue flow and the dialogue of the second dialogue flow sequentially; and executing the dialogue of the second dialogue flow and the dialogue of the first dialogue flow sequentially, wherein when the first dialogue flow is executed immediately after the second dialogue flow, selection criteria for selecting one scenario from among a plurality of pre-stored scenarios as a scenario of the first dialogue flow comprise criteria based on utterance contents of the second dialogue flow, the plurality of pre-stored scenarios are stored with information indicating likelihood of selection of each scenario associated with each scenario, and the selection criteria are criteria according to which a selection is performed based on the likelihood when a selection of one scenario from among the plurality of pre-stored scenarios based on utterance contents of the second dialogue flow is judged to be inappropriate.

* * * * *